United States Patent [19]

Gabriner et al.

[11] Patent Number: 5,848,403
[45] Date of Patent: Dec. 8, 1998

[54] SYSTEM AND METHOD FOR GENETIC ALGORITHM SCHEDULING SYSTEMS

[75] Inventors: Daniel C. Gabriner, Lexington; Stephen D. Milligan, Stow; Joseph J. Destefano, Northboro; David J. Montana, Arlington, all of Mass.

[73] Assignee: BBN Corporation, Cambridge, Mass.

[21] Appl. No.: 838,914

[22] Filed: Apr. 11, 1997

Related U.S. Application Data

[60] Provisional application No. 60/027,651 Oct. 4, 1996.
[51] Int. Cl.[6] ........................................ G06F 15/18
[52] U.S. Cl. ................................. 706/13; 705/8
[58] Field of Search ...................... 35/13; 705/8; 706/13

[56] References Cited

U.S. PATENT DOCUMENTS 5,319,781   6/1994   Syswerda ..................................... 705/8

OTHER PUBLICATIONS

S. Bagchi, et al., "Exploring Problem–Specific Recombination Operators for Job Shop Scheduling", Proceedings of the 4th Int. Conf. of Genetic Algorithms, 1991.

J. Paredis, "Exploiting Constraints as Background Knowledge for Genetic Algorithms: a Case–study for Scheduling", *Parallel Problem Solving from Nature, 2*, R. Manner and B. Manderick (Editors), 1992.

H.–L. Fang, et al., "A Promising Genetic Algorithm Approach to Job–Shop Sceduling, Rescheduling, and Open–Shop Scheduling Problems", Proceedings of the Fifth International Conference on Genetic Algorithms, University of Illinois at Urbana–Champaign, Jul. 17–21, 1993.

M.D. Kidwell, et al. "Genetic Algorithm for Dynamic Task Scheduling", Proceedings of the IEEE 13th Annual International Pheonix Conference on Computers and Communications, Apr. 12–15, 1994.

C.Y. Lee, et al., "A Genetic Algorithm for Job Sequencing Problems with Distinct Due Dates and General Early–Tardy Penalty Weights", Computers Ops. Res. vol. 22, No. 8, pp. 857–869 (1995).

E. Falkenauer and S. Bouffouix, "A Genetic Algorithm for Job Shop," Proc. 1991 IEEE Int'l. Conf. on Robotics and Automation, pp. 824–829, Apr. 1991.

H. Mitra and P. Ramanathan, "Genetic Approach for Scheduling Non–preemptive Tasks with Precedence and Deadline Constraints," Proc. 26th Hawaii Int'l. Conf. on System Sciences, vol. 2, pp. 556–564, Jan. 1993.

G.H. Kim and C.S.G. Lee, "An Evolutionary Approach to the Job–shop Scheduling Problem," 1994 IEEE Int'l. Conf. on Robotics and Automation, pp. 501–506, May 1994.

I. Ahmad, et al., "Task Assignment in Distributed Computing Systems," Proc. Int'l. Phoenix Conf. on Computers and Communications, pp. 49–53, Mar. 1995.

(List continued on next page.)

*Primary Examiner*—Robert W. Downs
*Attorney, Agent, or Firm*—Leonard C. Suchyta

[57] ABSTRACT

An improved Genetic Algorithm scheduling system includes system for encoding and testing hard constraint information. Each resource and task includes an associated capability and constraint indicating component. A comparison of the capability and constraint components provides an indication of the associated resource is capable of perform the proposed task. The system also includes a method of creating genomes using cost factors and weight settings to produce initial genomes which encode at least partly optimized schedules. The weight settings can be manipulated to emphasize different cost factors during genomes creation. This method also allows changes to be added into a running GA scheduling system, in that new or changed tasks and new or changed resources are encoded into the genome population. The system further includes a method of efficiently detecting and deleting duplicate genomes by converting genomes into a schedule representation, then re-encoding the genomes, and performing a sequential comparison of the genomes.

44 Claims, 8 Drawing Sheets

OTHER PUBLICATIONS

L.-J. Park and C.H. Park, "Genetic algorithm for job shop scheduling problems based on two representational schemes," Electronics Letters, vol. 31, No. 23, pp. 2051–2053, Nov. 1995.

S. Ronald, et al., "Representational Redundancy in Evolutionary Algorithms," IEEE Int'l. Conf. on Evolutionary Computation, vol. 2, pp. 631–636.

I. Ono, et al., "A Genetic Algorithm for Job-shop Scheduling Problems Using Job-based Order Crossover," Proc. 1996 IEEE Int'l. Conf. on Evolutionary Computation, pp. 547–552.

| TASK T1 | RESOURCE R1 |
|---------|-------------|
| TASK T2 | RESOURCE R2 |
| TASK T3 | RESOURCE R1 |
| TASK T4 | RESOURCE R3 |
| TASK T5 | RESOURCE R2 |
| TASK T6 | RESOURCE R1 |
| TASK T7 | RESOURCE R2 |
| TASK T8 | RESOURCE R1 |
| TASK ... | RESOURCE ... |

Fig. 3B

TIME →

| RESOURCE R1 | TASK T1 | TASK T3 | TASK T6 | TASK T8 |
|-------------|---------|---------|---------|---------|
| RESOURCE R2 | TASK T2 | TASK T5 | TASK T7 | |
| RESOURCE R3 | TASK T4 | | | |

SYSTEM AND METHOD FOR GENETIC ALGORITHM SCHEDULING SYSTEMS

RELATED APPLICATIONS

The present application claims the benefit of U.S. Provisional Application No. 60/027,651 filed Oct. 4, 1996, which is incorporated herein by reference.

BACKGROUND

Genetic Algorithms (GAs) have been applied to a vast number of computer simulated and real-world problems. GAs have proven very useful for finding a solution to many problems involving a large number of variables and parameters.

One area which has benefitted from GAs is the generation of schedules for resources to perform various tasks. Scheduling occurs everywhere in the real world, some examples include machine shop production, field service, employee coverage, process scheduling on computers, etc. Scheduling problems benefit from GAs ability to search vast solution spaces and migrate towards an efficient solution.

GA computer programs have many shortcomings however. One of the greatest problems is that they are slow. As the number of variables increase, the size of the solution space grows exponentially. GA systems often take several hours or days to evolve to an optimum solution to a problem. This often requires GA programs to run on high-priced, powerful computers to reduce the search time. Providing GA systems which are deliverable on low-cost computers is not possible.

There are several factors which affect the speed of GA systems. The population of genomes must often go through several hundred cycles of creation, testing, evaluation and altering before a solution is found. Each stage of a cycle requires computational power.

The size of the genome population is problematic. A large population allows for more area of the solution space to be explored at once, but requires more processing time for each cycle. The work of creating the initial genomes is usually performed randomly, which requires minimal processing time. However, once genomes are combined using crossover techniques and/or mutation operators, the processing speed slows down.

Several attempts have been made to increase the speed of GA programs. In many examples, a GA system will have hard constraints and soft constraints. Hard constraints are requirements a genome must meet in order to qualify for a fitness testing. If a genome fails hard constraints, this usually means the genome encodes an illegal solution to the problem. For example, in a scheduling system, meeting hard constraints includes generating a schedule in which resources are not scheduled to perform different tasks at the same time. An example of failing hard constraints is if resources are assigned to tasks which the resources are unqualified to perform. As a detailed example, in a repair shop, if a technician is unqualified to repair a printer, then a GA genome which encoded a schedule which met the hard constraints would not assign that technician to the task of repairing a printer.

By removing genomes which don't meet hard constraints before running fitness evaluations on the genome pool, Genetic Algorithm systems can save time by not pursuing unusable solutions. However, testing genomes to determine if they meet hard constraints is still processing intensive. Continuing with the above example of a repair shop, the task of determining if a technician is qualified to repair a particular printer is very problematic. Skill levels and qualifications vary over every industry, and comparing resource qualifications to task requirements is difficult to program into a system.

Further, tasks often have multiple requirements. Matching up one or more resources that are qualified to perform a certain tasks can take many iterations of computer time. A single genome which encodes a schedule with many resources and tasks will require a large amount of processing time to determine if all hard constraints are met. Checking all the genomes in the population therefore requires a great amount of processing time.

Another cause of GA excessive processing requirements is the time for the GA system to converge to promising areas of the solution space. As stated previously, a solution space for real world GA system applications is enormous. The GA system commences searching the solution space by randomly encoding an initial population of genomes. The chances of any random genome being close to an optimal solution is fairly remote. Only after thousands of iterations of the GA cycle will genomes start to converge to an optimal solution in the solution space.

Further, it is entirely possible for a GA system to converge on one area of the solution space, and completely miss another area with a much better solution. This is often due to the random initial population of genomes, which can simply miss optimal areas of the solution space. Once the GA system starts evolving, the genomes will focus on areas of the solution space they are already in. The process of genome mating and crossover will not lead the genomes to the unexplored areas of the solution space. Consequently, good solutions can be missed entirely.

Most GA systems address this problem by increasing the initial genome population, which thereby requires much more processing time and degrades the overall performance of the GA system.

The other attempt to address this problem is through mutation of the genomes. However, mutation is performed randomly, and only after many cycles in which the genome population has already converged on one area of the solution space. Most mutations result in unfit genomes, which do poorly in the fitness evaluation and are dropped from the population. Stumbling upon a mutation which forces a genome into a new area of the solution space is statistically unlikely. Therefore, GA systems often must run for hundreds or thousands of cycles to increase the odds that a random mutation will result in a genome entering the optimal solution space.

While the GA system is running, identical genomes will often be created. As the cycle of the fittest genomes performing crossovers with each other continues, identical genomes occur even more frequently. These identical genomes are redundant. In effect, they clog up the gene pool. Since the size of a genome pool (population) is limited, the redundant genomes take up space which could include other genomes which have varied solutions. Therefore, these redundant genomes often force a genome population to converge on one solution without exploring other possible solutions.

Accordingly, many GA systems will scan the genome population and eliminate identical genomes. This is usually done by a simple comparison the genome data structure arrays. If the genome arrays are identical, one of the duplicate genomes is eliminated, thereby freeing up space for another unique genome to be added.

There is a problem in detecting identical genomes, however. Depending on the information encoding technique for the genome, several genomes can contain identical information, but not be identical. In other words, two genomes could have different genetic codes in their arrays, but the information (solution) encoded in their arrays is the same. A comparison of the arrays will not reveal that the two genomes are actually the same.

An example of this is a genome encoding for use by a GA scheduling system. In reference to FIG. 3A, an encoding for a schedule of a set of tasks by a set of resources includes an ordered set of pairs, with each pair being a task identifier matched up with a resource identifier. The position in the set indicates the order in which resources will perform tasks. If task-resource pairs are switched around in the set, the schedule encoding can still be the same. For example, if resource R1 is listed to do three tasks, T1, T3 and T6; two genomes which pair R1 up with those three tasks in that order (but have different intervening pairs) are similar. Therefore it is problematic to determine whether two genomes encode the same information.

Yet another problem with GA systems is the difficulty of changing data while the GA system is running. Any changes in the data usually requires discarding the present state of the Genetic Algorithm system and starting over at the beginning. This severely limits the use of GA systems to solve real-world problems, since the GA systems take a long time to find a solution, and any changes in the data requires the GA system to start over.

In real-world problems, such as job shop scheduling, there are continuous changes, due to resources becoming available and unavailable, jobs taking longer or shorter than expected, and any of the myriad of factors which prevent jobs from getting done, and therefore having to reschedule.

If a GA system is stopped and given new data after it has run for awhile, the change dramatically affects the entire system. The GA system has already started to converge on one solution to the problem, when the data gets changed. This data change will often result in many previously fit genomes failing the hard constraints, and doing poorly in the fitness evaluation. The solution the GA system was converging on may no longer be the best solution, whereupon the GA system must attempt to converge on a new area of the solution space. The GA must stumble across the new solution via mutations, which takes a long time. Often, it is better to start the whole GA system over again with updated data.

Accordingly, what is needed is an improved scheduling system which can represent any variety of scheduling hard constraints, and quickly test genomes to determine if they meet the hard constraints.

Another requirement is an improved scheduling system which can start out with a population of genomes which are already optimized by several parameters, in order to allow a GA system to more quickly determine an optimal solution.

Yet another requirement is a technique for allowing changes to schedule requirements to be inserted into a running scheduling system without causing undue delays and problems.

Yet another requirement is a technique for quickly detecting and removing genomes which encode duplicate information from a population.

SUMMARY OF INVENTION

The system includes encoded constraint information for use in a scheduling system. A resource capability indicating component is associated with one or more resources. The resource capability indicating component indicates at least one capability of the resource.

There is a corresponding task constraint indicating component, which is associated with one or more tasks. The task constraint indicating component indicates one or more constraint requirements for the tasks.

The resource capability indicating component and task constraint indicating component may conveniently be represented using bit arrays or bit masks. Each capability and corresponding constraint are indicated by a predetermined index into the bit arrays. A bitwise comparison of the resource and task bit arrays indicates whether the associated resource has the required capabilities to perform the associated task. A bitwise AND operation on the two bit arrays, with a comparison of the result to the task bit array provides an indication as to whether the associated resource can perform the associated task.

The scheduling system can determine a schedule for a group of resources to perform a group of tasks. The system includes a method for selecting a resource to perform a task, where the resources have associated cost factors. The method includes selecting one or more cost factors, and then selecting a task from the list of unassigned tasks. A bid is then produced for each resource for performing the selected task, based on the selected cost factors. The resource with the best bid is then selected, and the genome is encoded with an indication that the selected resource will perform the selected task.

Each cost factor has an associated weight setting, which includes a value from 0 and 1. The weight setting indicates how important the cost factor is in determining and producing a cost factor bid. The system adjusts the weight settings to produce different genomes with different cost factors emphasized.

The resource bids allow a running GA scheduling system to be updated with changes in the schedule information, such as a new task needing scheduling, or a resource becoming unavailable. The GA scheduling system is halted, and the fittest genome in the genome population is selected. The resources produce bids based on the cost factors, weight settings and schedule information from the selected genome. The resource with the best bid is selected to perform the task, and the selected genome is updated with the new resource/task pair encoding. The remaining genomes in the genome population are also updated with the selected resource/task pair encoding.

This method works also for when a resource becomes unavailable. All the tasks which were assigned to that resource are rescheduled as new tasks, using the resource bid process. The GA scheduling system can then resume operation.

Duplicate genomes are detected and removed from the genome population by converting information encoded in a genome into a schedule representation, and then converting the schedule representation into a newly encoded genome. The genome is then compared the other genomes in the population using a sequential comparison of the information encoded in the genome structure. If a genome is determined to be a duplicate of another genome, the genomes is eliminated, or not added to the new genome population.

DETAILED DESCRIPTION

Figure 1:
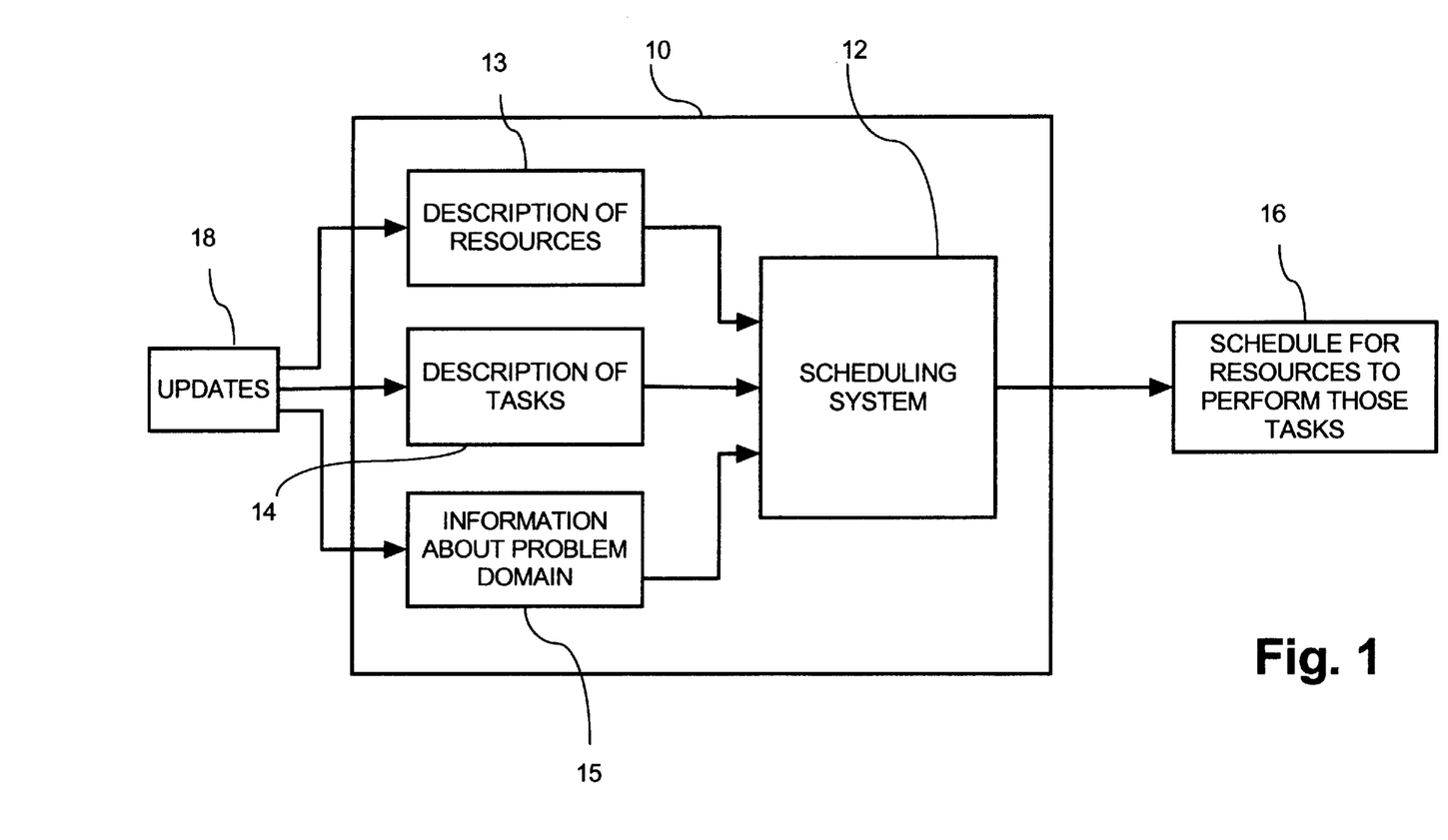
FIG. 1 is an overview of a scheduling system for producing a schedule for a set of resources to perform a set of tasks.

A general scheduling system is shown in FIG. 1. Scheduling system 10 runs on a general or special purpose computer system 10. The scheduling system 12 has information about the scheduling problem, in the form of a description of the resources 13 available for performing tasks. The description of resources information 13 is as general or detailed as necessary for the scheduling system 12 to determine a useful schedule.

Scheduling system 12 also has information in the form of a description of the tasks 14 to be performed. Again, the information quantity and content varies depending on the system.

Scheduling system 12 also can receive information about the problem domain 15. This information 15 is separate from the resource descriptions 13 and task descriptions 14, and for example can include hints and general rules to help scheduling system 12 produce optimal schedules 16.

Although the resource descriptions 13, task descriptions 14 and information 15 are illustrated as contained in the computer system 10, other configurations are possible. The information 13–15 can be separately stored in separate computer systems or databases, or entered by a user separately, and available to scheduling system 12 by sequential requests, or downloaded by batch processing. As an example, resource description information 13 might not change too often, and therefore be stored inside computer system 10, while task description information 14 changes on a daily basis, and therefore is stored on a separate task entry system, and then provided to scheduling system 12 when a schedule 16 is to be produced.

One problem with scheduling systems is that all the provided information 13–15 often changes, and thereby requires updates 18. By their very nature, schedule are contemporaneous and change constantly. Updates 18 can occur at any time, due to both planned and unplanned changes. Updates 18 can effect all information 13–15 available to the scheduling system 12.

Figure 2:
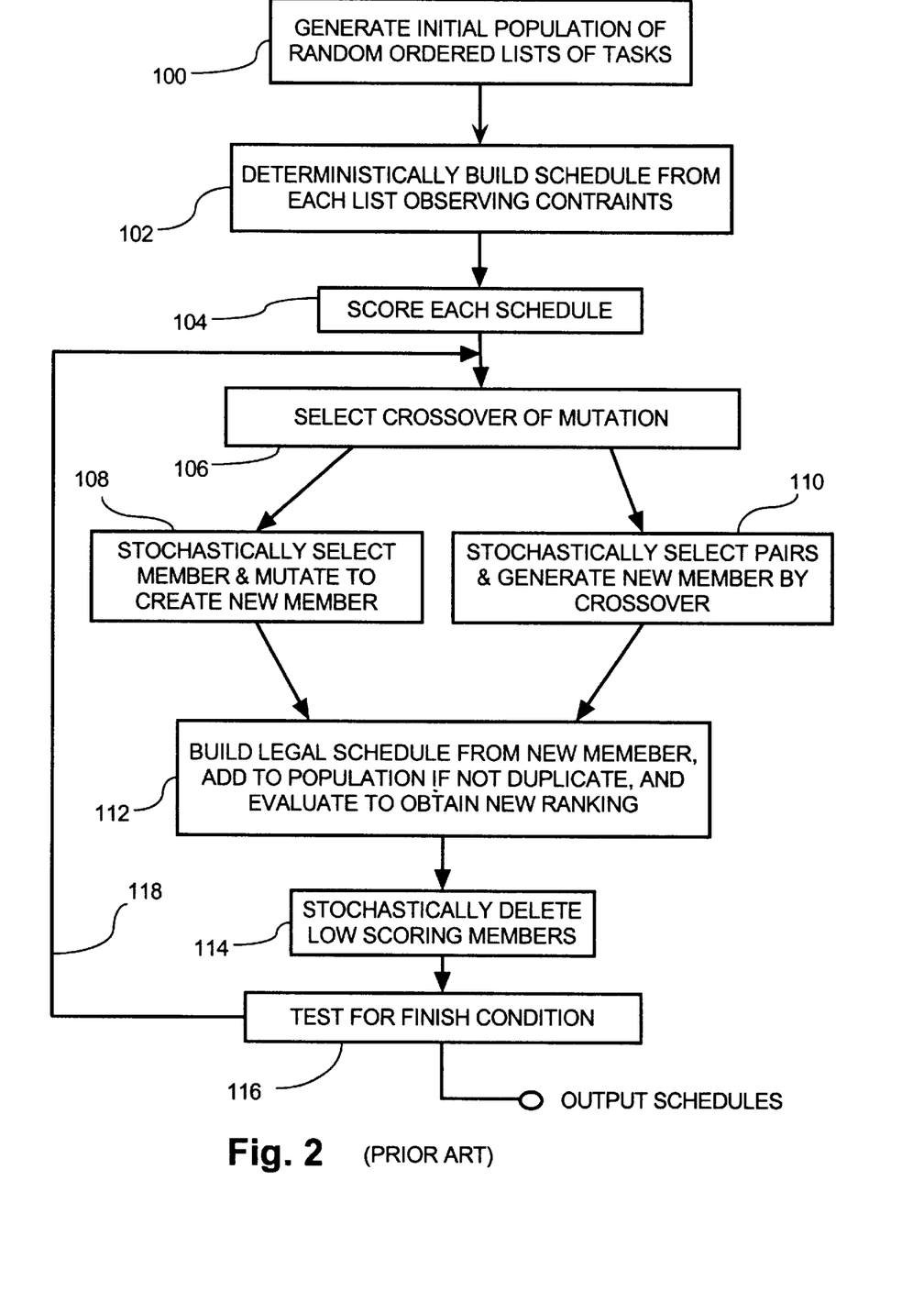
FIG. 2 shows an overview of steps performed by a prior art genetic algorithm system in searching for an optimal schedule solution.

An illustrative example of the steps performed by prior art GA (Genetic Algorithm) scheduling systems is shown in FIG. 2. An initial population of genomes containing encodings of a set of tasks to be performed by a set of resources is created, step 100. Each genome is randomly created, with task/resource pairs matched up by random selection. Once the initial population is created, the genomes are evaluated for fitness. For GA scheduling system, genome evaluation includes building a schedule based on the information encoded in the genome, step 102.

The schedules are then each evaluated, step 104. The evaluation should produce a ranking of how good the schedule is, based on measurable parameters. In the case of a GA scheduling system, some parameters include schedules that maximize the available resource usage to complete all tasks in a minimal amount of time or cost.

Once the genomes are evaluated and ranked, the population can undergo changes in an attempt to produce new genomes with better schedules. The two techniques used most often include crossover and mutation operations, step 106. For crossover operations, step 110, two parent genomes are stochastically selected, and a new genome is created usually by randomly combining sections of both parents' genomes. For mutation operations, step 108, a single genome is stochastically selected, and one or several individual locations in that genome are randomly altered.

The newly created or altered genomes are checked to make sure they encode a valid schedule (for example, a schedule which conforms to hard constraints, as will be discussed below), step 112.

The new population is evaluated to determine the fitness of the genomes, and low scoring members are deleted, steps 112 and 114. Finally, the GA scheduling system checks to determine if a finish condition has occurred, step 116. A finish condition can be based on a schedule being produced which meets or exceeds a predetermined threshold for fitness, such as a schedule which schedules all the tasks to be completed within a predetermined time limit. Other possible finish conditions include a number of times the GA system has cycled, for example one thousand times, or determining that the schedule fitness has not improved at all over the last N cycles.

If the finish condition has not been met, the GA system starts another cycle, as generally shown by arrow 118. A GA system can perform hundreds or thousands of cycles to attempt to converge on an efficient schedule.

Figure 3A:
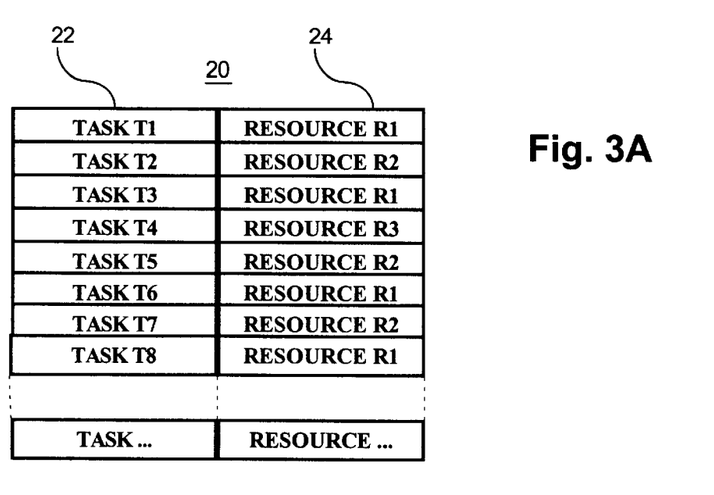
FIG. 3A shows a typical encoding for a genome for a GA scheduling system.

A genome representation, according to one embodiment of the present invention, comprises an ordered set of pairs 20, FIG. 3A. Each pair comprises a task indicator 22 and a resource indicator 24. The task indicator 22 is any identifier which can uniquely identify a task, including an index into a table of tasks, a pointer to task representation, or a data structure. The resource indicator 24 is similar in that any identifier which uniquely identifies the resource can be utilized. Genome 20 is implemented by any means, including arrays, linked pointers, strings, tables etc. The length (number of pairs) of genome 20 can be variable. In the preferred embodiment, the genome length is based on the total number of tasks to be scheduled.

Each pair in genome 20 indicates a resource assigned to perform a task. The entire genome 20 therefore represents a potential schedule for the available resources to complete a given set of tasks. For example, the genome 20 FIG. 3A encodes partial information as displayed in Sample Schedule 26, FIG. 3B. Three resources, R1, R2, and R3 are scheduled to perform tasks T1–T8. Each resource performs tasks in the order in which the resource is paired with tasks in genome 20. As shown in sample schedule 26, resource R1 is scheduled to perform tasks T1, T3, T6 and T8 in that order.

The GA scheduling system also includes information about the tasks to be performed, and the resources. This information is often domain specific to the type of tasks being scheduled. For example, in a repair shop maintaining a fleet of trucks, there is specific information concerning tasks, often referred to as constraints. Such constraints include the estimated time to complete a given task, availability of the truck, special parts which must be available before work can be done, and special training needed to perform the dedicated task.

In GA scheduling system, constraints are often divided into hard constraints and soft constraints. Hard constraints are rules or requirements which must be satisfied in a proposed schedule. A genome which encodes information which does not satisfy hard constraints will produce an unusable schedule. Examples of hard constraints include levels of skill or competence to perform a task, required parts or equipment, steps which must be performed in a specific order, and various time requirements. In the example of the repair shop for the fleet of trucks, the task of repair a truck's transmission requires a worker qualified to repair transmissions. A schedule is unusable if unqualified mechanics are assigned to perform tasks.

Most all schedulable tasks have hard constraints. The number of hard constraints depends on the problem domain.

Soft constraints are rules and preferences a GA scheduling system can consider in producing schedules, but are usually not absolute requirements for a valid schedule. Some examples of soft constraints include time preferences, priority of tasks, preventing overqualified workers from doing trivial tasks, etc. GA scheduling systems often include soft constraints in the fitness evaluation. A genome must include a schedule which satisfies hard constraints, or it will be removed from the population. A genome which satisfies most soft constraints will do well in fitness evaluations.

Genomes which encode schedules which don't meet hard constraints are unfit. Therefore, the unfit genomes should be removed once they are detected, or preferably before they are created. In a GA scheduling system according to the present invention, when genomes are being initially created, hard constraints are checked during creation. Therefore unfit genomes are never created. This test is also performed when genomes are altered by operation of the GA system, for example by mutation.

Figure 4:
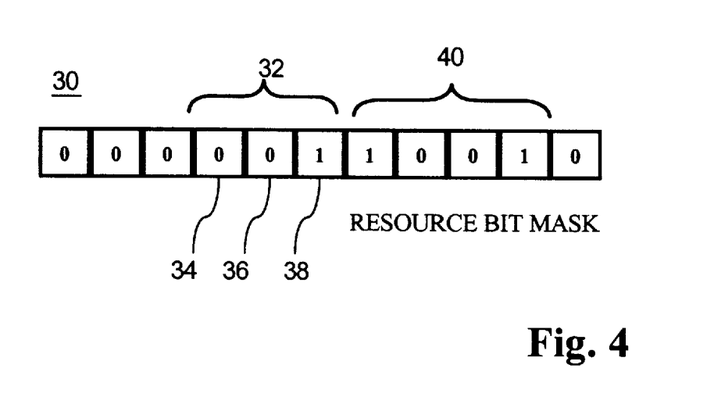
FIG. 4 shows a resource capability encoding according to one embodiment of the present invention.

A system for encoding hard constraint information according to the present invention includes a resource bit array or mask 30, FIG. 4. Resource bit array 30 includes an ordered set of bits, wherein a predetermined index into resource bit array 30 indicates a capability of the resource associated with resource bit array 30. Each resource represented in a GA scheduling system has an associated resource bit array 30. Two or more resources can have the same resource bit array 30. The resource bit arrays 30 can be included in a data structure for each resource with other resource information, or all together in a separate data structure. The contents of the resource bit array 30 usually don't change, and can be stored in a permanent database for access by the GA scheduling system.

Each index into resource bit array 30 indicates a capability of the resource. Continuing with the truck repair example, if a resource is a mechanic, index location 34 indicates a qualification to work on electrical systems, index location 36 indicates a qualification to work on turbo chargers, and index location 38 indicates an qualification to work on transmissions. In the case of resource bit array 30, the mechanic can work on truck transmissions, but not on electrical systems or turbo chargers. As another example, if a resource is a repair bay, indexed locations into the associated resource bit array 30 indicate special equipment available in the bay, such as hydraulic lifts, etc.

Resource bit array 30 can include any number of capabilities, some which may be similar, such as mechanic qualifications 32, or days a mechanic works, 40. There is no requirement to group various capability indicators together in resource bit array 30, since each capability indicator is separate and distinct.

Figure 5:
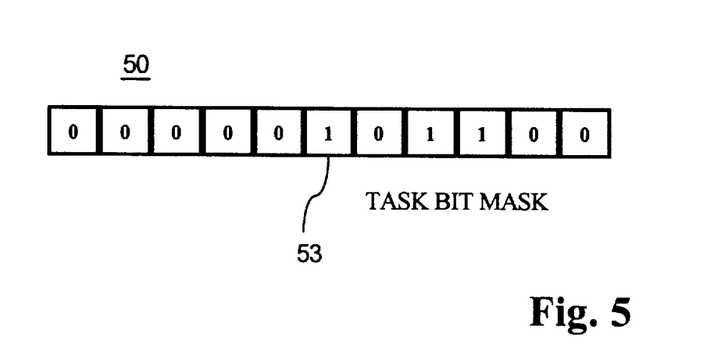
FIG. 5 shows a task constraint encoding according to one embodiment of the present invention.

Correspondingly, each task representation in a GA scheduling system according to the present invention will have an associated task bit array 50, FIG. 5. Indexed locations into task bit array 50 indicate a constraint or requirement for the task. For example, if a task requires a mechanic qualified to work on transmissions, location 52 will be activated. Other indexed locations will be activated to indicate other constraints for performing the associated task. The length of task bit array 50 depends on the number of possible constraints for tasks in the scheduling problem domain.

To determine if a resource has the proper qualifications to perform a given task, a GA scheduling system according to the present invention compares resource bit array 30 with task bit array 50. Each indexed location in resource bit array 30 indicates a qualification which corresponds to a constraint in task bit array 50. If each constraint indicated in task bit array 50 is matched by a qualification indicated in resource bit array 30, then the resource associated with resource bit array 30 meets the hard constraints for performing the task associated with task bit array 50. The GA scheduling system can therefore proceed in scheduling the resource to perform the task, for example by encoding the task and resource pair into a genome.

In the preferred embodiment, task bit array 50 and resource bit array 30 are implemented as bit masks. The step of comparing the two bit arrays includes performing a bitwise AND operation on the two bit masks. The resultant bit mask is then compared to the original task bit mask 50. If they are identical, then the hard constraints are satisfied. The comparison of the resultant bit array and task bit array 50 can be done by performing a bitwise Exclusive-Or operation on the two bitmasks. If the result is zero (or an array of all 0s), then the constraints are satisfied. Therefore the test can be stated as NOT (tbm XOR (tbm AND rbm)) where tbm is the task bit array and rbm is the resource bit array. This works in computer languages such as C or C++, where a 0 value is considered FALSE, and also in hardware implementations. In other languages, the result of the XOR operation is tested to determine if it is equal to 0.

This comparison guarantees that all the constraints encoded in the task bit array will be satisfied if the resource bit array includes all corresponding capabilities. A resource can have many more capabilities, useful for other constraints, but not fewer capabilities than needed for the task. Otherwise the resource is not be qualified to perform that task, and the comparison will fail.

Resource bit array 30 and task bit array 50 do not need to be the same length. For example, if a GA scheduling system is scheduling several resources to perform a task (for instance if the scheduling domain requires a team of workers and equipment to be assembled to perform a task), the task bit array 50 could be much larger to include all the various constraints among all the types of resources. A resource would only require a resource bit array 30 large enough to include all qualification requirements specific to that particular type of resource. The only requirement for comparison is that the resource bit array 30 be offset to the proper comparison section in the task bit array 50.

Alternatively, a task representation can have multiple task bit arrays 50 associated with it. In the above example where a task requires a team of workers and equipment to be scheduled, there can be a task bit array 50 for each resource type required to perform the task. The task bit array for a particular resource type would then be compared with the corresponding resource bit array indicating a possible resource to determine if that resource meets the hard constraints to perform that task.

Preparing a general GA scheduling system for the hard constraints peculiar to the problem domain is straightforward. The task description, including a list of all possible hard constraints is entered into the system. Similar tasks can have a prepared template of standard hard constraints. The system would then determine the length for task bit array 50 based on the number of hard constraints. Indexed locations in the task bit array are then assigned to indicate each hard constraint requirement.

The resource description is similarly prepared, with a list of qualifications possible for each resource. The length of resource bit array 30 is determined by the number of qualifications (extra length can be used if new qualifications might develop as the system is used). The indexed locations into the resource bit array 30 must match the indexed location in the task bit array 50 so that each constraint and corresponding qualification match up. If the resource bit array 30 and task bit array 50 are different lengths, an index offset would be used.

Although present invention is described in terms of software, the present invention can also be implemented in hardware, including special purpose designed integrated circuits (IC) to perform constraint/capability comparisons. Further, a predetermined set of indexes for constraints and capabilities can be hard-coded into special purpose hardware, firmware or read-only memory (ROM).

The method of initializing a population of genomes according to one embodiment of the present invention includes creating various genomes encoded with localized optimizations in the potential solution space. This produces initial genomes which are already optimized in certain areas. The GA scheduling system then can improve on the initial optimized genomes, thereby requiring less cycles and time to determine an optimized solution to the scheduling problem.

In most all scheduling problems, there is a set of cost factors associated with tasks and resources. Cost factors are measurable quantities which define a specific cost of a resource performing a specific task. Although some cost factors are measurable in terms of money (such as a technician's hourly billing charge, or a flat fee for a repair job), a cost factor includes any factors which are measurable in a quantitative way. Examples of cost factors include travel time, labor costs, overtime, experience levels, special equipment needs, worker preferences, time of day the task gets scheduled, penalties for overdue tasks, etc. Cost factors measure in units of cost over time. In one embodiment, cost factors are measured in hourly rates (cost per hour), although as previously stated, selection and measurement of cost factors is not limited only to factors which can be measured that way.

Although cost factors are a similar concept to components used in the fitness determinator of a GA system, there is no need for them to be identical or even use the same measurement techniques. A set of cost factors can be completely different from the measurements use by a GA fitness determinator.

Cost factors are used to produce a cost estimate bid for a particular resource performing a particular task.

Figure 6:
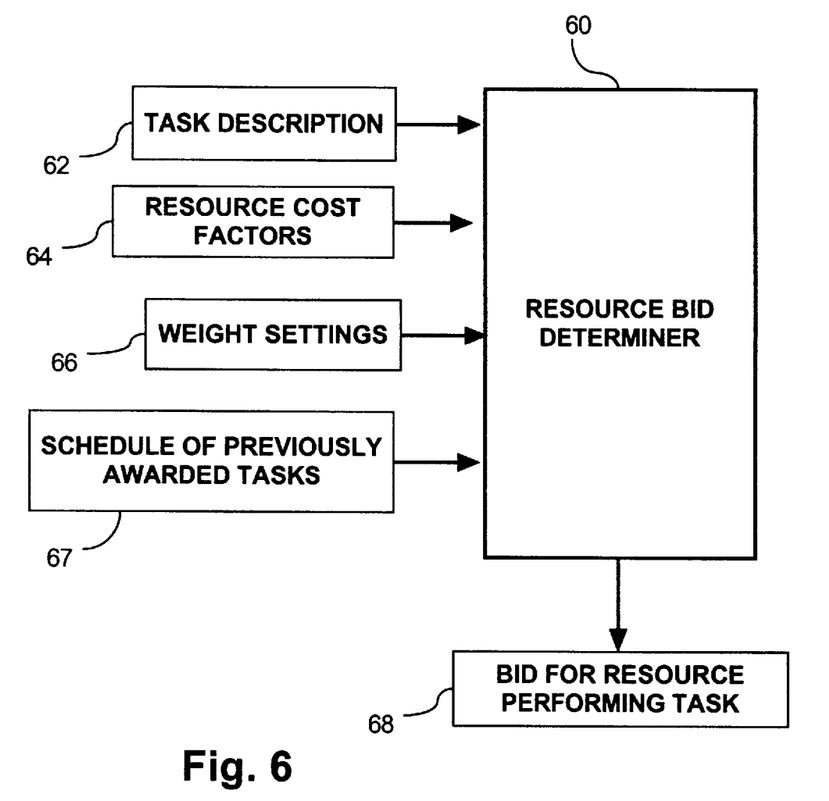
FIG. 6 is a pictorial view of a system for initializing genomes according to the present invention.

A system for producing optimized genomes includes a resource bid determinator 60, FIG. 6. A task description 62 is input to the resource bid determinator 60, which outputs a bid for that resource to perform the task 68. A task description 62 includes information about performing the task, including estimated time, difficulty, distance to job, etc. A task description can include any amount of information.

Also input to the resource bid determinator 60 are resource cost factors 64 associated with a particular resource for which a resource bid is to be produced. Cost factors, as previously discussed, provide variables which help estimate a cost for the resource to perform the selected task.

Also input the resource bid determinator 60 are weight settings 66. A weight setting is a variable which determines how much a corresponding cost factor will influence a resource bid 68. Each cost factor in the resource cost factors 64 has a corresponding weight setting. In the preferred embodiment, a weight setting is a number between 0 and 1. A weight setting of 0 causes the associated cost factor to have no determinative effect on the resultant resource bid 68. A weight setting close to 1 causes the associated cost factor to have a mild to strong determinative effect on the resultant resource bid 68.

Weight settings are determined when the scheduling system is prepared for the scheduling domain, along with cost factors. However, unlike cost factors, weight settings can be dynamically altered at anytime while a scheduling system is running. Weight settings are normally predetermined for each cost factor to indicate how important that cost factor is overall. This allows a great many cost factors to help influence the resource bid, with an unique adjustment factor to emphasize each cost factors individual importance.

Resource bid determiner 60 also receives information of previous tasks 67 the resource is assigned to in the present schedule. This information is used by resource bid determiner 60 in both determining whether the resource is capable of performing the task (for example, if the resource is booked solid), and in producing a bid. An example of the latter is if the new task being bid on is at the same customer site of a task the resource is already scheduled for, the resource bid determiner 60 reduces the travel time appropriately and produces a bid based on the two task being performed on one trip to the customer site.

In a preferred embodiment of the present invention, the resource bid determiner 60 determines a bid using the following formula:

$$W_1 CF_1 T_1 + W_2 CF_2 T_2 + W_3 CF_3 T_3 \ldots$$

where $W_1$ is a weight setting for a first cost factor, $CF_1$ is a first cost factor associated with a resource, and $T_1$ is information from the task description 62 which indicates the (possibly estimated) quantity of the specific cost (associated with the cost factor) needed to perform the task. $W_2$, $CF_2$ and $T_2$ are associated with a second cost factor, etc.

For example, in a scheduling system for scheduling technicians to repair electronic equipment at customer sites, a first cost factor $CF_1$ would be travel cost for going to and from a customer site. Travel cost includes time the technician is unavailable (but not working), cost associated with mileage, and other factors. $T_1$ is the expected amount of time needed to get to and from the customer site. $W_1$ is set to 0.2, indicating that travel time is not a big considering in a resource bid for the technician to perform the equipment repair task. As will discussed shortly, the weight settings are adjusted according to system settings.

Continuing with the above example, another cost factor $CF_2$ is customer equipment down time. If customer equipment is broken, the customer calls in and requests service.

This is then a task to be scheduled by the scheduling system. The later a scheduling system schedules a technician to get to the customer, the longer the customer cannot use the equipment. In this case, $T_2$ is a measure of the time between a customer calls and when a technician will get there (according to a proposed schedule). $W_2$ is the weight setting which indicates how important minimizing customer down time is. A low weight setting indicates that customer down time is not a major factor, while a high weight setting indicates that minimizing customer down time is very important. For this example, a weight setting is 0.99, indicating that rapid responses to customer problems is very important for the bidding process. This example demonstrates that cost factors can include other quantities besides real costs in terms of money charges per hour. Here, the cost factor of avoiding customer down time is measured in other terms, including customer satisfaction.

Another cost factor for the above example would be the resource labor cost. $CF_3$ is hourly rate charged for the technician to the customer. $T_3$ is the estimated time the technician will spend at the customer site repairing the equipment. Note that different technicians (resources) can have different billing rates, and different estimated times to perform the same task. A technician with much experience would have a higher billing rate, but require less time to diagnose and repair the equipment. $W_3$ is the weight setting of how important the resource labor cost is in determining a resource bid. A weight setting close to 0 indicates that labor cost is not important, while a weight setting close to 1 indicates that labor costs are an important consideration. For this example, the weight setting is 0.5, showing medium importance.

Another cost factor for the above example would be a penalty factor for performing service later than requested. The electronic equipment repair service of this example has contract agreements with customers that a technician will come out within 48 hours of a customer service request, or the repair service will reduce the service charge by 50%. The Cost Factor $CF_4$ for this would be a formula which would indicate the loss of revenue to the repair service if a technician isn't scheduled to visit the customer site until after 48 hours. The value of $T_4$ is the amount of time that would pass between the customer call and the scheduled visit, and $W_4$ is the weight setting of the importance of the repair service avoiding the late penalty. If the repair service is so busy that incurring penalty charges for tasks is less important than other factors in scheduling, a low weight setting is used. If incurring penalty charges must be avoided, a higher weight setting is used.

This previous example is used as an illustration of possible cost factors and weight settings for a particular scheduling problem domain. There is no limit on the ability of the present invention to represent and manipulate detailed task and resource information using the disclosed technique.

The information 62–67 used by resource bid determiner 60 is made available from any form of storage, including databases which are used by the GA scheduling system.

The method of generating genomes according to one embodiment of the present invention includes producing initial genomes with emphasis on various cost factors. First, appropriate weight settings are selected step 120 FIG. 6. The weight settings indicate how much each particular cost factor affects resource bids. These weight settings are manipulated in several different ways, as will be discussed below.

Figure 7:
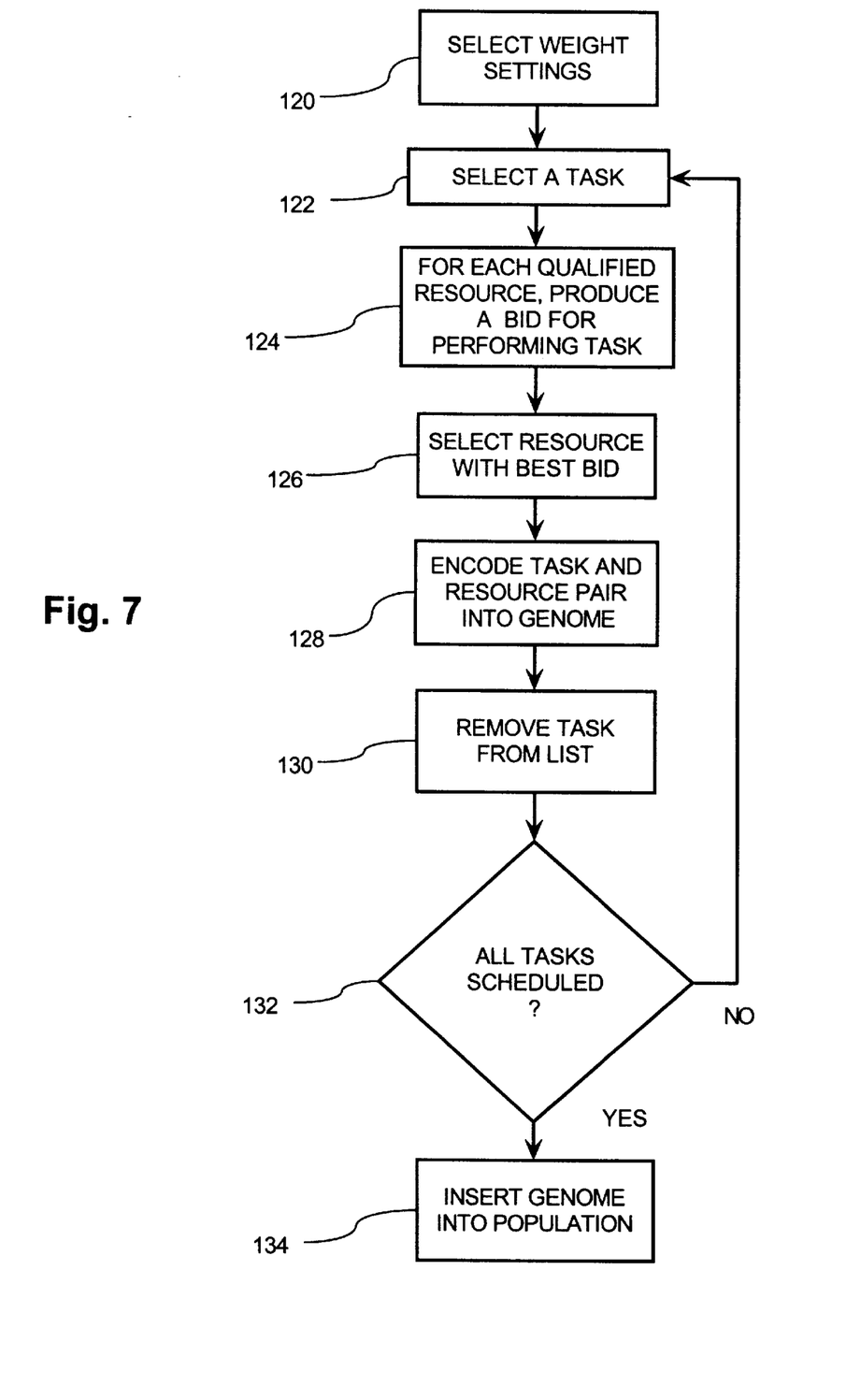
FIG. 7 is a flowchart showing how a genome is initialized according to one embodiment of the present invention.

To produce a genome, a task is selected from the group of tasks to be scheduled, step 122. In one embodiment, the tasks are selected in the order the tasks were entered into the system. In another embodiment, the tasks are sorted for selection based on a simple metric closely linked to the problem domain.

All the resources from the group of available resources then produce bids for performing that task, step 124. Each resource produces its bid according to the task description 62, cost factors 64 and weight settings 66. In a preferred embodiment, a potential resource is checked to determine if it meets the hard constraints required to perform the selected task, as previously described. If the potential resource does not meet the hard constraints, it does not produce a resource bid.

The resource with the best bid is selected, step 126. In terms of the cost factors and weight settings described previously, the best bid is the numerically lowest bid. However, systems which use cost factors and weight measurements in different techniques and equations can have different evaluations to determine the best bid, such as the highest bid, or the bid closest to a predetermined numeric value.

The selected resource with the best bid is paired with the selected task, and the genome is encoded with an indication that the selected resource is scheduled to perform the selected task, step 128. The resource/task pair are encoded in the next available location in the genome.

Alternatively, a resource bid can include a preferred position in a schedule. For example, a resource produces a low bid by planning to schedule the new task before another task already scheduled for that resource, as indicated by schedule information 67. If that resource is selected, the resultant resource/task pair are encoded in the genome in the correct position to indicate that resource will perform the new task before that resource performs the previously scheduled task.

The selected task has now be scheduled, so it is removed from the group of unscheduled tasks, step 130. If all tasks are scheduled, by reason of there being no more tasks in the groups, step 132, then the genome is complete, step 134. Otherwise, the process of selecting a unscheduled task, obtaining bids from eligible resources, selecting a resource with the best bid, and encoding the genome appropriately as described in steps 124–132 are repeated.

The result of these steps is a genome which encodes a potential schedule which is already at least partially optimized. The optimization depends on the weight settings and the cost factors. When the genome is inserted into the population and the GA scheduling system runs, the genome will potentially have a better fitness than randomly created genomes, and will help the GA scheduling system to reach a solution more quickly. There are other advantages to the partially optimized genome, as will be discussed below.

In the preferred embodiment of the present invention, several genomes are produced which each encode schedules with different cost factors emphasized. A result of this technique is to seed the solution space with genomes "positioned" in potentially optimized locations. The differently optimized genomes are produced by adjusting the weight settings. A weight setting for a particular cost factor is selected, and all other weight settings are temporarily lowered or set to 0. The resource determinator 60 FIG. 6 will then produce a resource bid 68, wherein the bid 68 is strongly influenced by that particular cost factor. When all available resources produce bids 68 for performing the selected task, the resource with the lowest bid number can perform the selected task at the lowest cost (for that particular cost factor).

The resultant genome is therefore optimized based on the selected cost factor. One genome which is optimized for each cost factor is so produced, by selectively lowering all weight settings except the selected weight setting. Also at least one genome is produced with all weight settings at their normal (predetermined) value, thereby producing one genome which takes into account all such variables.

In the preferred embodiment, some genomes with random encodings are also created using a standard randomizing genome creation routine. These randomly encoded genomes are added to the initial population. The number of randomly encoded genomes added to the initial population depends on the size selected for the initial population. Further, other genomes may be created by a combination of random encoding and variations on cost factor weight settings.

A GA scheduling system which is run with an initial population of such genomes will spend much less time converging on a promising area of the solution space. As an example, in a test case involving a scheduling problem with 300 tasks and 30 resources, a GA system with a randomly initialized genome population pool of 100 took 10,000 iteration cycles to produce an optimized schedule. Using the above described genome initialization process, the same GA system took only 5,000 iteration cycles to produce an optimized schedule.

Further, in a GA scheduling system with random initialized genomes, an area of the solution space with the best solutions can be entirely overlooked, due to the randomness of the genomes. However, a population of genomes with already partially optimized solutions is very likely to include at least one genome in the outstanding area of the solution space, and thereby guide the GA scheduling system into exploring that area.

A notorious problem of scheduling systems is that by its very nature, the scheduling data keeps changing. No matter how well the scheduling system works, activities take less or more time than expected. An eternally slipping schedule is a well-known reality for many situations.

Schedule changes for scheduling systems are implemented either by interrupting the running scheduling system at any time, and adding the change, or collecting all changes and periodically updating the scheduling system with all the collected changes in a batch fashion.

A GA scheduling system generally can be interrupted at two times. The first is before the genome population undergoes fitness evaluation ranking, which usually is right after the genome population has been modified by mutation and crossover changes. Alternatively, the GA system is interrupted after a genome population has undergone fitness evaluation ranking. GA systems can be updated either by batch updating or interrupt, preferably either updating method is done at one of the two aforementioned times.

Although GA systems can be updated with new data, changes implemented by adding randomly selected resource/task pairs will often result in many previously fit genomes doing poorly in the fitness evaluation. The solution the GA system was converging on may no longer be the best solution, whereupon the GA system must attempt to converge on a new area of the solution space. The GA must stumble across the new solution via mutations, which takes a long time. Often, it is better to start the whole GA system over again with updated data.

The present invention addresses this problem to allow GA systems to update schedules timely and efficiently. Changes in the data generally occur by tasks being added, deleted, or modified, or resources being added or deleted. Updating a running GA scheduling system with new data depends on the change.

If a task is deleted, all the genomes are scanned for an encoding of the deleted task, and that resource/task pairing is removed from the genome. The removal is performed by any standard technique, including replacing the resource/task pairing with a null indicator (which is ignored by the scheduler), or the genome is regenerated with the pairing removed. This can happen as part of genome updating, which is described below.

When a task is deleted, as previously described, the GA scheduling system continues to run with the updated genomes. The scheduled position previously marked for that task will be filled in by the following task. Therefore the schedules (as encoded in the genomes) are still valid, and a GA scheduling system can continue to evolve the schedules to an optimal goal.

Figure 8:
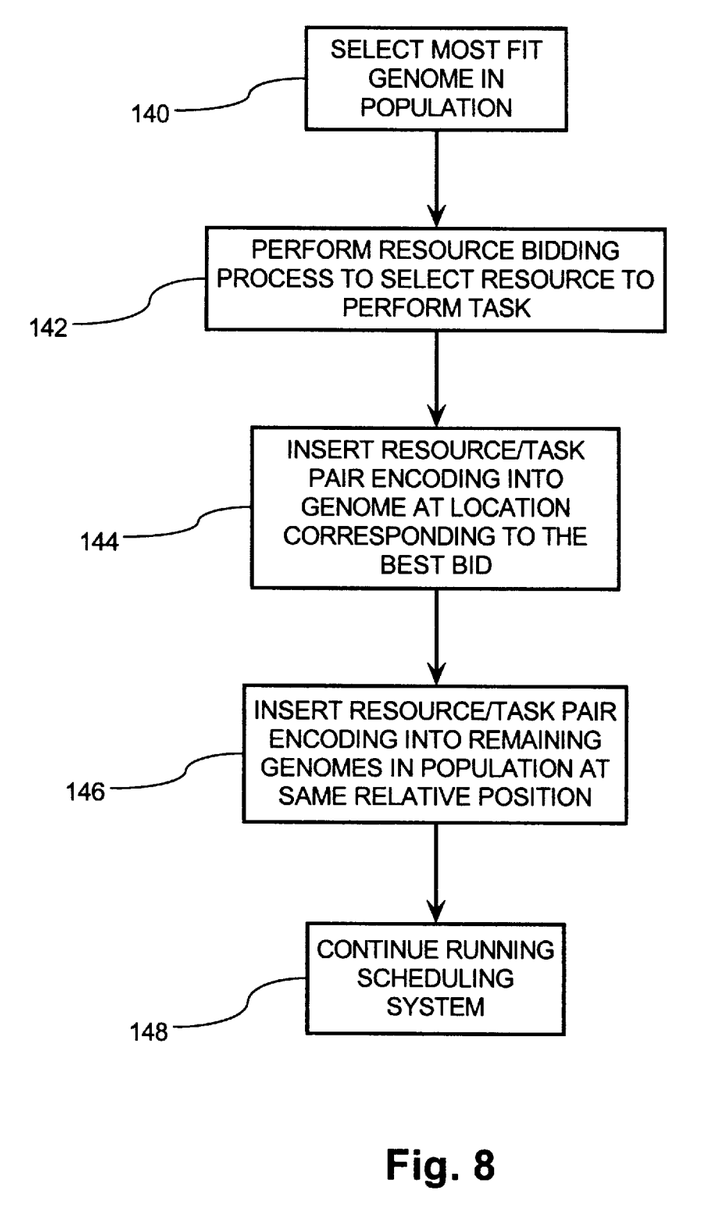
FIG. 8 is a flowchart showing how new tasks are added to an already running scheduling system according to the present invention.

If a task is added, the most fit genome in the population is selected, step 140 FIG. 8. The most fit genome is the genome which is ranked highest according to the fitness evaluator of the ga system.

The resource bidding process as previously described in reference to FIG. 7 is performed for the new task, step 142 FIG. 8. The qualified resources bid on performing the new task, using the cost factors and predetermined weight settings. The resource with the best bid is selected to be scheduled to perform the task.

Next, the resource/task pair is encoded into the genome at the location which corresponds to the best bid as provided by the selected resource, step 144. When arrays are used to implement genomes, a new array is created with enough locations to include all the resource/task pair encodings, and the contents of the old array are copied into the new array, with the new resource/task pair encoding inserted into the new array at the proper location.

The remaining genomes are in population are then updated with the new resource/task pair encoding, step 146. The new resource/task pair encoding is inserted into each genome at the location corresponding to the location determined by the best bid for the selected resource. The genome is scanned to locate the resource/task pair encoding which immediately follows the new resource/task pair encoding in the new schedule, and the new task/resource pair encoding is inserted before it. If the genome does not have the proceeding resource/task pair encoding, the new resource/task pair encoding is added at the end.

Once all the genomes in the population are updated, the GA scheduling system continues, step 148.

This results in an optimal pairing of resource to task. The task is added into the schedule in an intelligent fashion, instead of simply by a random pairing. The GA scheduling system is only minimally affected by the addition, instead of being thrown off track by a random change which could adversely affect the fitness of the genomes.

If a resource is deleted (becomes unavailable to perform tasks), all resource/task pair encodings with that resource are removed from all genomes in the population. Then all the "orphan" tasks are each added to the schedule according to the new task scheduling process of FIG. 8. Preferably each orphan task is added in one at a time. The most fit genome is updated, and the remaining genomes are then updated according to the insertion point positions in the most fit genome. This cycle is repeated until all orphan tasks are encoded into the schedule.

If a new resource is added, it is preferable to start the GA scheduling system over from the beginning, since a new resource usually will dramatically change an entire schedule. The resource bid process of FIG. 7 assists in producing properly seeded genomes which make starting the GA scheduling system over again a reasonable solution when resources are added.

The method of eliminating duplicate genomes in the population is preferably performed at stages in the GA scheduling system when genomes are added to the population. This includes when genomes are first created, whether by random methods or the bidding process as previously described. Other times include when genomes are modified using crossover and/or mutation operators, and evaluated and ranked for fitness. Genomes can be added to an existing population, or a new empty population pool can be created, and genomes are added to it as the genomes are batch processed by the GA scheduling system.

Figure 9:
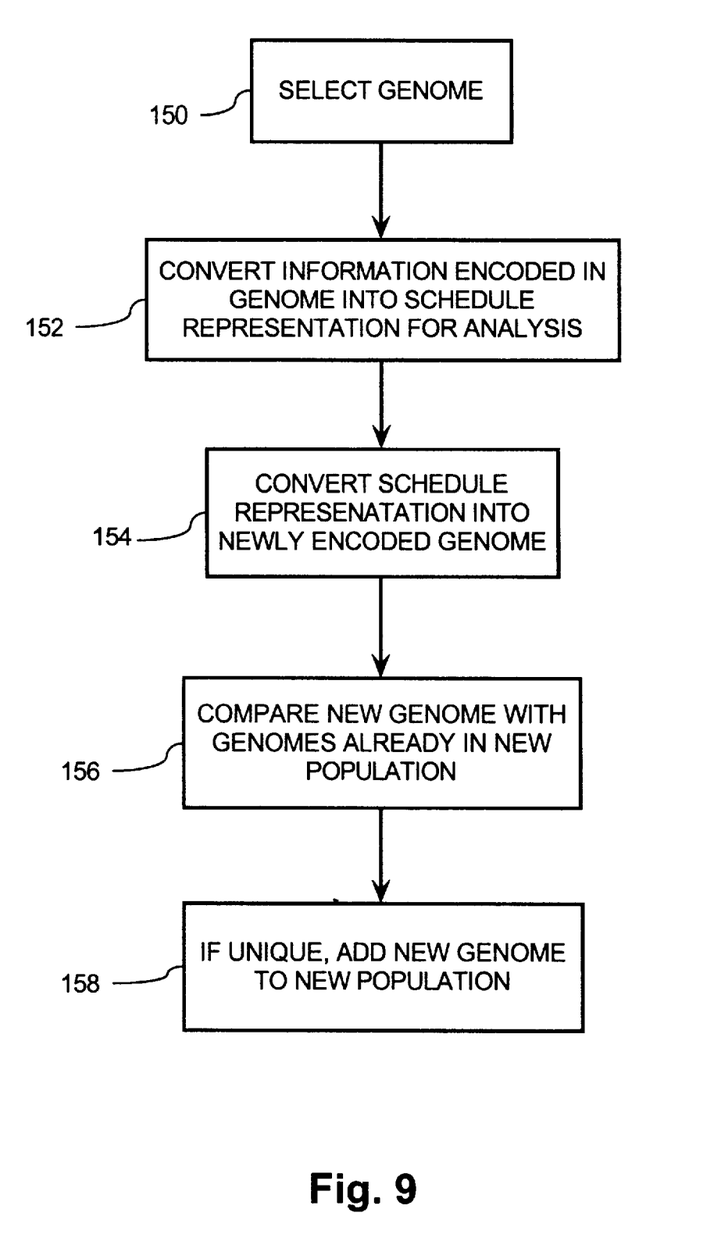
FIG. 9 is a flowchart showing how duplicate genomes are detected and eliminated during operation according to the present invention.

To eliminate duplicate genomes, a genome is first selected from the population, step 150, FIG. 9. A schedule representation is built from information encoded in the genome, step 152. Depending on the stage of the GA scheduling system, the schedule representation may be required to analyze the genome, for example, the fitness evaluator must analyze the schedule to determine a ranking of the fitness of the genome. Therefore, the schedule representation may already be available. However, if the schedule is not available, it is created.

At step 154, the schedule representation is converted into a newly encoded genome. Preferably the schedule representation is sequenced through, and each resource/task encoding pair is sequentially encoded into the new genome. Any previously used encoding of the genome is discarded. The array or data structure for the previously used genome is deallocated by the system, or preferably, the array or data structure is reused, with new data written in, thereby saving system overhead.

Figure 3B:
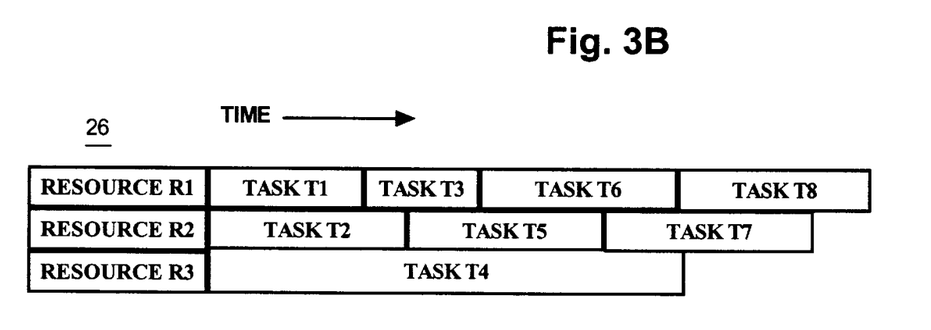
FIG. 3B show a schedule built from the information encoded according to FIG. 3A.

As previously described in reference to FIG. 3A and 3B several non-identical genomes can encode information which results in the same schedule. When the schedule representation is converted back into a genome encoding, the conversion results in a sorting of the resource/task pair encodings of the genome. The process of converting the genomes encodings into schedule representation and then back into genome encodings therefore allows easy detection of duplicate genomes.

Before the new genome is added into the population, it is compared to all genomes already in the population, step 156. In the preferred embodiment, the new genomes is sequentially compared to every genome already present. The comparison is performed by any method for comparing data structures for similarity, including linear scanning by index comparisons of both genomes, with the comparison stopping immediately if a difference is detected. If the entire length of the new genome and comparison genome is scanned without finding a difference, then the two genomes are identical.

If the new genomes is unique, as compared to all other genomes already in the population, the new genome is added to the population, step 158.

This method has several advantages. Checking for duplicate genomes becomes an integrated step in the gas processing, occurring at times when new genome populations are assembled. The duplicate check is no longer a separate, time-consuming step to be performed at various points. The GA scheduling system creates schedule representations at various times for its analysis of genomes. For example in determining fitness, the genome encodings must be converted into schedule representations anyway. Therefore the present invention allows "reuse" of the information representation, thereby saving processing time.

Further, scanning genomes to determine if they are identical is fast, since the scanning can stop the instant a difference is found. Also, genomes are compared as they are added to the new population. If the whole population was assembled first, and then checked for duplicates, the system would need to keep detailed track of which genome was compared to which, in order to avoid redundant comparisons.

All the features of the present invention are implemented on a general purpose computer system. Data concerning scheduling information is input from a database, or other input means including entering by hand at a workstation. Such data includes resource descriptions and capabilities (hard constraint information), task description templates, task descriptions and constraints (hard constraint information), cost factor analysis data, weight settings, and scheduling hints and preferences.

The database is any standard database, including databases running on other systems, but accessible by the computer system running the scheduling system. As an example, resource information can be obtained and updated from several locations in the field by querying computers carried by field technicians, with information transmitted by modem or radio communications. As the present invention allows for continuous dynamic changes to the scheduling data, high speed communication links with the users of the produced schedules is useful.

The scheduling system runs on a Sun SPARC station with standard storage and memory requirements. Software which implements the system is written in any standard high level language, including C and C++. Resultant schedules are displayed on a computer screen, printed out, or stored in a form which can be read and manipulated by other system applications.

As various changes could be made in the above constructions without departing from the scope of the invention, it should be understood that all matter contained in the above description or shown in the accompanying drawings shall be interpreted as illustrative and not in a limiting sense.

What is claimed is:

1. A system for encoding constraint information in a scheduling system running on a computer, said scheduling system for determining a schedule for a plurality of resources to perform a plurality of tasks, said system comprising:

a resource capability indicating component, associated with a resource, said resource capability indicating component indicating at least one capability of said resource;

a task constraint indicating component, associated with a task, said task constraint indicating component indicating at least one constraint requirement of said task;

wherein a comparison of said resource capability indicating component and said task constraint indicating component provides an indication to said scheduling system as to whether said resource associated with said resource capability indicating component has said at least one capability necessary for said at least one constraint requirement of said task associated with said task constraint indicating component.

2. The system of claim 1 wherein said resource capability indicating component includes a bit array.

3. The system of claim 2 wherein said task constraint indicating component includes a bit array.

4. The system of claim 3 wherein said comparison of said resource capability indicating component and said task constraint indicating component includes performing a binary AND operation on said resource bit array and said task bit array.

5. The system of claim 4 wherein said comparison of said resource capability indicating component and said task constraint indicating component includes comparing results of said performance of a binary AND operation with said task bit array.

6. The system of claim 3 wherein a predetermined index in said resource bit array encodes a capability indicator of said resource associated with said resource bit array.

7. The system of claim 6 wherein a predetermined index in said task bit array encodes a constraint indicator of said task associated with said task bit array.

8. The system of claim 7 wherein if said predetermined index in said task bit array and said predetermined index in said resource bit array are equal, said capability indicator matches said constraint indicator.

9. The system of claim 1 wherein said scheduling system running on a computer includes a Genetic Algorithm (GA) scheduling system.

10. A system for encoding constraint information in a genetic algorithm system running on a computer, said genetic algorithm system for determining a schedule for a plurality of resources to perform a plurality of tasks, said system comprising:
   a resource bit array, associated with at least one resource, wherein at least one predetermined index into said resource bit array indicates a capability of said at least one resource;
   a task bit array, associated with at least one task, wherein at least one predetermined index into said task bit array indicates a constraint of said at least one task; and
   wherein a comparison of said resource bit array and said task bit array provides an indication to said genetic algorithm system that said at least one resource associated with said resource bit array can perform said at least one task associated with said task bit array.

11. The system of claim 10 wherein said comparison of said resource bit array and said task bit array includes performing a binary AND operation on said resource bit array and said task bit array.

12. The system of claim 11 wherein said comparison of said resource bit array and said task bit array includes:
   comparing results of said binary AND operation on said resource bit array and said task bit array, with said task bit array.

13. The system of claim 10 wherein said task bit array includes a plurality of predetermined indexes, each indicating a constraint.

14. The system of claim 10 wherein said genetic algorithm system assigns a resource associated with said resource bit array to perform a task associated with said task bit array, based on said indication that said resource can perform said task.

15. The system of claim 14 wherein said genetic algorithm system assigns said resource to perform said task by encoding a genome with an indication that said resource will perform said task.

16. In a scheduling system running on a computer, said scheduling system for determining a schedule for a plurality of resources to perform a plurality of tasks, each of said plurality of resources including a plurality of associated cost factors, each associated cost factor including an associated predetermined weight setting, said predetermined weight setting providing an indication of a predetermined importance of said associated cost factor, a method for selecting a resource to perform a task comprising:
   selecting one of said associated cost factors;
   selecting an unscheduled task from said plurality of tasks;
   for each resource in said plurality of resources, producing a cost factor bid for performing said selected task, based on said selected associated cost factor;
   selecting a resource for performing said task based on said cost factor bid; and
   providing an indication that said selected resource is scheduled to perform said selected task.

17. The method of claim 16 wherein said method for selecting a resource to perform a task is performed for each task of said plurality of tasks, using the said selected associated cost factor.

18. The method of claim 17 wherein said steps are performed a plurality of times to produce a plurality of schedules, wherein each produced schedule is produced with a different selected associated cost factor.

19. The method of claim 16 wherein said step of providing an indication that said selected resource is scheduled to perform said selected task includes encoding said indication that said selected resource is scheduled to perform said selected task into a genome for a Genetic Algorithm (GA) scheduling system.

20. The method of claim 16 wherein said step of selecting one of said associated cost factors includes selecting a plurality of said associated cost factors.

21. The method of claim 16 wherein said step of for each resource in said plurality of resources, producing a cost factor bid for performing said selected task includes the step of:
   if a resource in said plurality of resources is unable to perform said selected task, not producing a cost factor bid for performing said selected task.

22. The method of claim 16 wherein said predetermined weight settings for all associated cost factors except for said selected one of said associated cost factors is set to a value of 0.

23. A method for generating a genome for a genetic algorithm system running on a computer, said genetic algorithm system for determining a schedule for a plurality of resources to perform a plurality of tasks, said method comprising:
   providing a plurality of predetermined cost factors associated with each resource;
   providing a plurality of weight settings corresponding to each of said plurality of predetermined cost factors, said weight settings indicating an importance of said associated cost factor;
   selecting an unscheduled task from said plurality of tasks;
   for each resource in said plurality of resources, producing a cost factor bid for performing said selected task, based on said selected predetermined cost factors and weight settings;
   selecting a resource for performing said task based on said cost factor bid; and
   initializing said genome with an indication that said selected resource is scheduled to perform said selected task.

24. The method of claim 23 wherein said method is performed for each task of said plurality of tasks, using said selected associated cost factor.

25. The method of claim 24 further including:
   before the step of selecting an unscheduled task from said plurality of tasks, selecting a predetermined cost factor, and setting said associated weight settings to a value of 0 for all weight settings other than the weight setting associated with said selected cost factor.

26. The method of claim 25 wherein said steps for generating a genome are performed a plurality of times to generate a plurality of genomes, wherein a different one of said plurality of associated cost factors is selected for each performance of said steps for generating a genome.

27. The method of claim 24 wherein said method of generating a genome includes inserting said new genome into a genome population for a Generic Algorithm (GA) system which has already evolved said genome population.

28. The method of claim 27 wherein said new genome is generated in response to a change in at least one of said plurality of resources.

29. The method of claim 28 wherein a change in at least one of said plurality of resources includes adding and removing a resource.

30. The method of claim 27 wherein said new genome is generated in response to a change in at least one of said plurality of tasks.

31. The method of claim 30 wherein a change in at least one of said plurality of task includes adding and removing a task.

32. The method of claim 23 wherein said step of for each resource in said plurality of resources, producing a cost factor bid for performing said selected task includes the step of:
 if a resource in said plurality of resources is unable to perform said selected task, not producing a cost factor bid for performing said selected task.

33. The method of claim 23 wherein each of said associated weight settings is a number value in the range of 0 and 1.

34. A method for generating a genome for a genetic algorithm system running on a computer, said genetic algorithm system for determining a schedule for a plurality of resources to perform a plurality of tasks, each of said plurality of resources including a plurality of associated cost factors, each cost factor including an associated weight setting, said method comprising:
 selecting one of said associated cost factors;
 assigning a value of 0 to each weight value associated with each associated cost factor other than said selected cost factor;
 selecting an unscheduled task from said plurality of tasks;
 for each resource in said plurality of resources, producing a cost factor bid for performing said selected task, based on said associated cost factors and associated weight values;
 selecting a resource for performing said task based on said cost factor bid; and
 initializing said genome with an indication that said selected resource is scheduled to perform said selected task.

35. A system for producing a population of genomes for a genetic algorithm system running on a computer, said genetic algorithm system for determining a schedule for a plurality of resources to perform a plurality of tasks, each of said plurality of resources including at least one associated cost factor, said system comprising:
 a weight setting associated with each of said at least one associated cost factor, said weight setting providing an indication of an importance of said associated cost factor;
 a means for calculating resource costs for a selected resource to perform a selected task with based on said associated cost factors and associated weight settings.

36. The system of claim 35 wherein said weight settings are dynamically changed to alter said indication of an importance of said associated cost factor.

37. The system of claim 35 wherein at least one of said plurality of resources or said plurality of tasks changes, and genomes are produced which include said changes.

38. In a Genetic Algorithm scheduling system running on a computer, said Genetic Algorithm scheduling system including a plurality of genomes for determining a schedule for a plurality of resources to perform a plurality of tasks, a method of adding a new task to said plurality of tasks while said genetic algorithm scheduling system is already running, comprising the steps of:
 providing a plurality of predetermined cost factors associated with each resource;
 providing a plurality of weight settings corresponding to each of said plurality of predetermined cost factors, said weight settings indicating an importance of said associated cost factor;
 halting said running genetic algorithm scheduling system;
 selecting a genome from said plurality of genomes;
 for each resource in said plurality of resources, producing a cost factor bid for performing said new task, based on said selected predetermined cost factors and weight settings;
 selecting a resource for performing said task based on said cost factor bid;
 encoding said selected genome with an indication that said selected resource is scheduled to perform said new task; and
 resume running said Genetic Algorithm scheduling system.

39. The method of claim 38 further including:
 encoding all genomes in said plurality of genomes with said indication that said selected resource is scheduled to perform said new task.

40. The method of claim 38 wherein said genome is selected from said plurality of genomes based on a genome fitness evaluation.

41. The method of claim 38 wherein a resource in said plurality of resources becomes unavailable, and all tasks as presently scheduled to be performed by said now unavailable resource are added as new tasks.

42. A method of detecting duplicate genomes in a genetic algorithm system, said method comprising:
 decoding first information encoded in a first genome;
 converting said first decoded information into a first re-encoded genome;
 decoding second information encoded in a second genome;
 converting said second decoded information back into a re-encoded second genome; and
 comparing said first re-encoded genome and said second re-encoded genome.

43. The method of claim 42 wherein said step of comparing said first re-encoded genome and said second re-encoded genome includes performing a sequential comparison of each element of said first and second re-encoded genomes.

44. The method of claim 42 further including after the step of comparing said first re-encoded genome and said second re-encoded genome, the step of:
 if said first re-encoded genome and said second re-encoded genome are equal, eliminating one of said first and second re-encoded genome.

* * * * *